(12) United States Patent
Xie et al.

(10) Patent No.: US 12,074,463 B2
(45) Date of Patent: Aug. 27, 2024

(54) BATTERY ASSEMBLY, ELECTRONIC DEVICE, AND BATTERY DETECTION SYSTEM

(71) Applicant: DONGGUAN NVT TECHNOLOGY LIMITED, Dongguan (CN)

(72) Inventors: Hong Xie, Dongguan (CN); Guanghui Chen, Dongguan (CN); Xuefeng Liu, Dongguan (CN)

(73) Assignee: DONGGUAN NVT TECHNOLOGY LIMITED, Guangdong (CN)

( * ) Notice: Subject to any disclaimer, the term of this patent is extended or adjusted under 35 U.S.C. 154(b) by 598 days.

(21) Appl. No.: 17/353,738

(22) Filed: Jun. 21, 2021

(65) Prior Publication Data

US 2021/0376631 A1 Dec. 2, 2021

Related U.S. Application Data

(63) Continuation of application No. PCT/CN2019/126420, filed on Dec. 18, 2019.

(30) Foreign Application Priority Data

Dec. 18, 2018 (CN) .......................... 201811547651.7

(51) Int. Cl.
*H02J 7/00* (2006.01)
*H01M 6/50* (2006.01)
(Continued)

(52) U.S. Cl.
CPC .......... *H02J 7/00038* (2020.01); *H01M 6/50* (2013.01); *H01M 6/5044* (2013.01);
(Continued)

(58) Field of Classification Search
USPC ........................................................ 320/106
See application file for complete search history.

(56) References Cited

U.S. PATENT DOCUMENTS

| 5,517,277 A | 5/1996 | Goto et al. |
| 2011/0199047 A1* | 8/2011 | Fujii ....................... B60L 53/16 320/109 |

(Continued)

FOREIGN PATENT DOCUMENTS

| CN | 101917028 A | 12/2010 |
| CN | 202094855 U | 12/2011 |

(Continued)

OTHER PUBLICATIONS

Dongguan NVT Technology Limited, International Search Report and Written Opinion, PCT/CN2019/126420, Mar. 18, 2020, 18 pgs.
(Continued)

*Primary Examiner* — Mohammed Alam
(74) *Attorney, Agent, or Firm* — Morgan, Lewis & Bockius LLP

(57) ABSTRACT

A battery detection system includes a battery assembly and an electronic device. The battery assembly includes a first connector and a detection module connected to the first connector. The electronic device includes a second connector and a control module connected to the second connector. When the first connector is connected to the second connector, the detection module is configured to output first identification information to the electronic device through the first connector. When the second connector receives the first identification information, the control module confirms that the battery assembly is in a connected state. After the first connector is disconnected from the second connector, the detection module generates and outputs second identification information. When information received by the second connector changes from the first identification information to the second identification information, the control module confirms that the battery assembly is disconnected.

14 Claims, 5 Drawing Sheets

(51) Int. Cl.
  *H01M 10/48*  (2006.01)
  *H01M 50/569* (2021.01)
  *H01R 13/66*  (2006.01)

(52) U.S. Cl.
  CPC ........ *H01M 10/48* (2013.01); *H01R 13/6691* (2013.01); *H01M 50/569* (2021.01)

(56) References Cited

U.S. PATENT DOCUMENTS

| | | | |
|---|---|---|---|
| 2012/0293117 A1* | 11/2012 | Suzuki | H02J 7/00038 320/108 |
| 2013/0149578 A1* | 6/2013 | Uchida | H01M 10/482 429/90 |
| 2013/0200843 A1* | 8/2013 | Tanabe | H02J 50/80 320/108 |
| 2013/0234666 A1* | 9/2013 | Lei | H01M 10/44 320/145 |
| 2015/0244188 A1* | 8/2015 | Suzuki | H02J 7/00047 320/107 |
| 2016/0164321 A1 | 6/2016 | Kuan | |
| 2016/0288653 A1* | 10/2016 | Tsukamoto | B60L 53/62 |
| 2017/0349057 A1 | 12/2017 | Namba et al. | |
| 2018/0342886 A1* | 11/2018 | Jo | H02J 7/00712 |
| 2019/0067961 A1* | 2/2019 | King | H02J 7/0045 |

FOREIGN PATENT DOCUMENTS

| | | |
|---|---|---|
| CN | 102934313 A | 2/2013 |
| CN | 202887364 U | 4/2013 |
| CN | 105911891 A | 8/2016 |
| CN | 205753551 U | 11/2016 |
| CN | 106325454 A | 1/2017 |
| CN | 107196352 A | 9/2017 |
| CN | 107958169 A | 4/2018 |
| CN | 207571743 U | 7/2018 |
| CN | 207924106 U | 9/2018 |
| CN | 108873759 A | 11/2018 |
| CN | 208134099 U | 11/2018 |
| CN | 209200058 U | 8/2019 |
| JP | H08182205 A | 7/1996 |
| JP | 2007066748 A | 3/2007 |
| JP | 2009064741 A | 3/2009 |
| JP | 2009171690 A | 7/2009 |
| JP | 2016040983 A | 3/2016 |

OTHER PUBLICATIONS

Office Action, CN201811547651.7, Dec. 31, 2020, 6 pgs.
Office Action, CN201811547651.7, Jun. 16, 2021, 9 pgs.
Dongguan NVT Technology Limited, Extended European Search Report, EP19901111.5, Jan. 4, 2022, 15 pgs.
Dongguan NVT Technology Limited, Communication Pursuant to Article 94(3), EP19901111.5, Aug. 30, 2023, 6 pgs.

* cited by examiner

BATTERY ASSEMBLY, ELECTRONIC DEVICE, AND BATTERY DETECTION SYSTEM

CROSS-REFERENCE TO THE RELATED APPLICATIONS

This application is a continuation application of PCT Patent Application No. PCT/CN2019/126420, filed on Dec. 18, 2019, which claims priority to Chinese Patent Application No. 201811547651.7, filed with the State Intellectual Property Office of the People's Republic of China on Dec. 18, 2018, all of which are incorporated herein by reference in their entirety.

TECHNICAL FIELD

This application relates to the technical field of batteries, and in particular, to a battery assembly, an electronic device, and a battery detection system.

BACKGROUND

A battery of an electronic device is primarily designed in a detachable mode and a non-detachable mode. For a non-detachable battery designed in the related art, the battery is not freely detachable from an electronic product. However, a problem existent in the related art is that, because an internal connection structure of the non-detachable battery is relatively fragile and a battery structure is of relatively low strength, the battery is very likely to damage, a connector is very likely to be short-circuited, and other similar problems are likely to occur during detachment if the detachment is not performed by a professional after-sales person. Therefore, the battery is at risk of being damaged during detachment. This impairs safety of the battery and the electronic device in use.

SUMMARY

This application aims to solve one of the technical problems in the related art at least to some extent.

Therefore, the purpose of this application is to disclose a battery detection system to identify detachment of a battery and ensure safety of the battery and an electronic device in use.

The second purpose of this application is to disclose a battery assembly.

The third purpose of this application is to disclose an electronic device.

The fourth purpose of this application is to disclose a battery detection method.

To fulfill the foregoing purposes, a first aspect of this application discloses a battery detection system. The battery detection system includes a battery assembly and an electronic device. The battery assembly includes a first connector and a detection module connected to the first connector. The electronic device includes a second connector and a control module connected to the second connector. The first connector fits with the second connector to implement connection. The detection module is configured to detect whether the first connector is connected to the second connector. When the first connector is connected to the second connector, the detection module outputs first identification information to the electronic device through the first connector. When the second connector receives the first identification information, the control module confirms that the battery assembly is in a connected state. After the first connector is disconnected from the second connector, the detection module generates and outputs second identification information. When information received by the second connector changes from the first identification information to the second identification information, the control module confirms that the battery assembly is disconnected.

In the battery detection system according to an embodiment of this application, when the first connector is connected to the second connector, the detection module outputs the first identification information to the electronic device through the first connector. When the second connector receives the first identification information, the control module confirms that the battery assembly is in a connected state. After the first connector is disconnected from the second connector, the detection module generates and outputs the second identification information. When the information received by the second connector changes from the first identification information to the second identification information, the control module confirms that the battery assembly is disconnected. Therefore, the battery detection system according to this embodiment of this application can detect connection status of the battery assembly and the electronic device, and identify detachment of a battery and ensure safety of the battery and the electronic device in use.

According to an embodiment of this application, before the detection module outputs the first identification information to the electronic device through the first connector, the control module further outputs a control signal to the battery assembly through the second connector; and the detection module further receives the control signal through the first connector, and outputs and locks the first identification information based on the control signal.

According to an embodiment of this application, the detection module includes at least one detection unit. Each detection unit possesses a first input end, a second input end, and an output end. Before the detection module outputs the first identification information to the electronic device through the first connector, the control module correspondingly outputs at least one first control signal and at least one second control signal to the battery assembly through the second connector. The first input end of each detection unit receives a corresponding first control signal. The second input end of each detection unit receives a corresponding second control signal. Each detection unit further generates a first identification signal based on the first control signal and the second control signal and outputs the first identification signal through the output end of each detection unit.

According to an embodiment of this application, the control module is further configured to: when each detection unit outputs the first identification signal, change a corresponding second control signal into a third control signal and output the third control signal through the second connector. The second input end of each detection unit receives the third control signal, and locks the first identification signal based on the third control signal so that the output end of each detection unit keeps outputting the first identification signal.

According to an embodiment of this application, when the first connector is disconnected from the second connector, a signal of the second input end of each detection unit changes from the third control signal to the second control signal, and a signal of the first input end of each detection unit changes from the first control signal to a fourth control signal. Each detection unit further generates a second identification signal based on the second control signal and the fourth control signal.

According to an embodiment of this application, the detection module outputs at least one first identification signal to the electronic device as the first identification information, where the at least one first identification signal is output by the output end of at least one detection unit. Alternatively, the detection module further includes a processing unit. The processing unit is configured to process at least one first identification signal output by the output end of at least one detection unit, so as to obtain a first processed signal. The detection module outputs the first processed signal to the electronic device as the first identification information. The detection module outputs at least one second identification signal to the electronic device as the second identification information, where the at least one second identification signal is output by the output end of at least one detection unit. Alternatively, the processing unit is configured to process at least one second identification signal output by the output end of at least one detection unit, so as to obtain a second processed signal. The detection module outputs the second processed signal to the electronic device as the second identification information.

According to an embodiment of this application, the battery assembly includes a battery cell, and supplies power to each detection unit through the battery cell. When the battery assembly stops supplying power to the electronic device, a signal of the second input end of each detection unit is maintained until the third control signal. Each detection unit locks the first identification signal based on the third control signal, and keeps outputting the first identification signal through the output end.

According to an embodiment of this application, the first control signal is a high-level signal, the second control signal is a rising-edge signal, the third control signal is a low-level signal, the fourth control signal is a low-level signal, the first identification signal is a low-level signal, and the second identification signal is a high-level signal.

According to an embodiment of this application, the control module is further configured to exercise restriction control on the battery assembly after confirming that the battery assembly is disconnected.

According to an embodiment of this application, the first connector possesses at least one first pin, at least one second pin, and at least one third pin. Each detection unit includes a flip-flop. The flip-flop possesses a CLK end, a D end, and a Q end. The CLK end of the flip-flop is used as a second input end of the detection unit and connected to a corresponding first pin in the first connector. The D end of the flip-flop is used as a first input end of the detection unit and connected to a corresponding second pin in the first connector. The Q end of the flip-flop is used as an output end of the detection unit and directly connected to a corresponding third pin in the first connector. Alternatively, the Q end of the flip-flop is used as an output end of the detection unit and connected to a corresponding input end of a processing unit in the detection module, where at least one output end of the processing unit is further correspondingly connected to the at least one third pin respectively.

According to an embodiment of this application, each detection unit further includes a first resistor and a second resistor. The CLK end of the flip-flop is connected to a positive electrode of a battery cell in the battery assembly through the first resistor. The D end of the flip-flop is connected to a negative electrode of the battery cell in the battery assembly through the second resistor and then grounded.

According to an embodiment of this application, a power end of the flip-flop is connected to a positive electrode of a battery cell in the battery assembly, and a ground end of the flip-flop is connected to a negative electrode of the battery cell in the battery assembly.

According to an embodiment of this application, the control module outputs the second control signal or the third control signal by controlling turn-on and turn-off of a switch assembly. The switch assembly includes: a first switch transistor, where a first end of the first switch transistor is connected to the second connector, a second end of the first switch transistor is grounded, a control end of the first switch transistor is connected to the control module, and the first switch transistor is turned on or off under control of the control module; and a third resistor, where one end of the third resistor is connected to the control end of the first switch transistor, and a second end of the third resistor is connected to the second end of the first switch transistor.

According to an embodiment of this application, the detection module is disposed in the first connector in a packaging manner.

To fulfill the foregoing purposes, a second aspect of this application discloses a battery assembly. The battery assembly includes a first connector and a detection module connected to the first connector. The first connector fits with the second connector of the electronic device to implement connection. The detection module is configured to detect whether the first connector is connected to the second connector. When the first connector is connected to the second connector, the detection module outputs first identification information through the first connector. The first identification information is used to indicate that the battery assembly is in a connected state. After the first connector is disconnected from the second connector, the detection module generates and outputs second identification information, and the second identification information changed from the first identification information is used to indicate that the battery assembly is disconnected.

In the battery assembly according to an embodiment of this application, when the first connector is connected to the second connector, the detection module outputs the first identification information through the first connector to indicate that the battery assembly is in a connected state. After the first connector is disconnected from the second connector, the detection module generates and outputs the second identification information. The second identification information changed from the first identification information is used to indicate that the battery assembly is disconnected. Therefore, the battery assembly according to this embodiment of this application can detect connection status of the battery assembly and the electronic device, and identify detachment of a battery and ensure safety of the battery and an electronic device in use.

To fulfill the foregoing purposes, a third aspect of this application discloses an electronic device. The electronic device includes a second connector and a control module connected to the second connector. The second connector fits with a first connector of a battery assembly to implement connection. The second connector receives first identification information output by the battery assembly. When the second connector receives the first identification information, the control module confirms that the battery assembly is in a connected state. The second connector receives second identification information output by the battery assembly. When information received by the second connector changes from the first identification information to the second identification information, the control module confirms that the battery assembly is disconnected, where the second identification information is generated after the first connector is disconnected from the second connector.

In the electronic device according to an embodiment of this application, when the second connector receives the first identification information output by the battery assembly, the control module confirms that the battery assembly is in a connected state. After the information received by the second connector changes from the first identification information to the second identification information, the control module confirms that the battery assembly is disconnected. Therefore, the electronic device according to this embodiment of this application can detect connection status of the battery assembly and the electronic device, and identify detachment of a battery and ensure safety of the battery and the electronic device in use.

Additional aspects and advantages of this application will be partly given in the following description, and a part thereof will become evident in the following description or will be learned in the practice of this application.

DETAILED DESCRIPTION OF EMBODIMENTS

Figure 1:
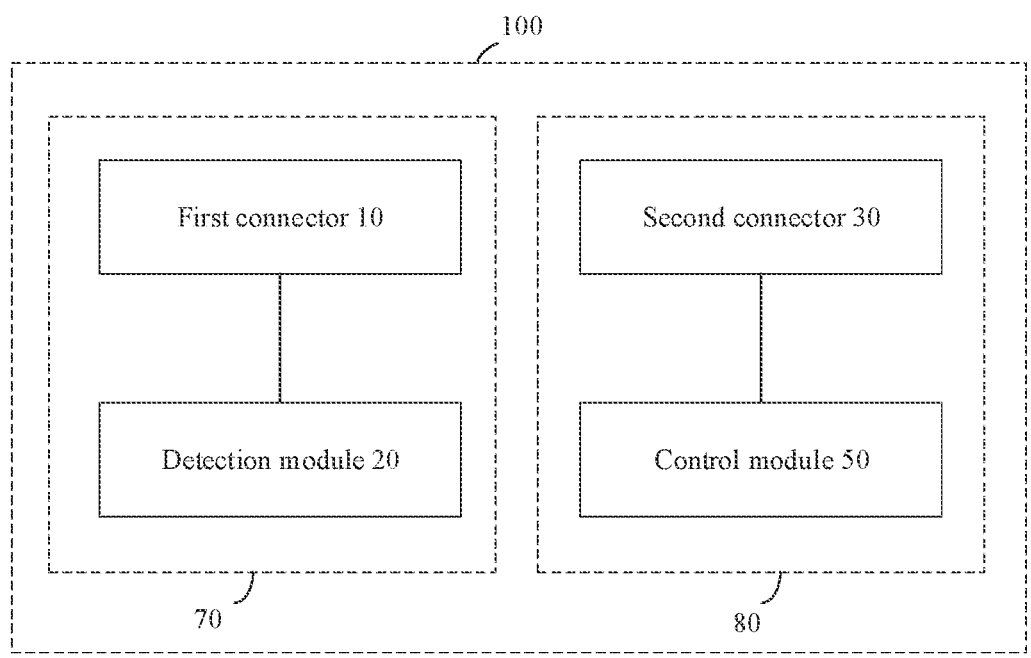
FIG. 1 is a schematic block diagram of a battery detection system according to an embodiment of this application.

The following describes embodiments of this application in detail. Examples of the embodiments are shown in the drawings, in which always identical or similar reference numerals indicate identical or similar components or the components that serve identical or similar functions. The embodiments described below with reference to the drawings are exemplary, and are intended to construe this application but not to limit this application.

The following describes a battery assembly and a battery detection system and method according to embodiments of this application with reference to the drawings.

FIG. 1 is a schematic block diagram of a battery detection system according to an embodiment of this application. As shown in FIG. 1, the battery detection system 100 includes: a battery assembly 70 and an electronic device 80. The battery assembly 70 includes a first connector 10 and a detection module 20 connected to the first connector 10. The electronic device 80 includes a second connector 30 and a control module 50 connected to the second connector 30.

The first connector 10 fits with the second connector 30 to implement connection. The detection module 20 is configured to detect whether the first connector 10 is connected to the second connector 30.

In addition, in an embodiment of this application, the detection module 20 is disposed in the first connector 10 in a packaging manner to protect an internal structure of the detection module 20 and enhance system reliability.

Understandably, after the first connector 10 fits with and is connected to the second connector 30, the battery assembly 70 may supply power to the electronic device 80.

When the first connector 10 is connected to the second connector 30, the detection module 20 outputs the first identification information to the electronic device 80 through the first connector 10. When the second connector 30 receives the first identification information, the control module 50 confirms that the battery assembly 70 is in a connected state. After the first connector 10 is disconnected from the second connector 30, the detection module 20 generates and outputs the second identification information. When the information received by the second connector 30 changes from the first identification information to the second identification information, the control module 50 confirms that the battery assembly 70 is disconnected.

It needs to be noted that the first identification information and the second identification information received by the second connector 30 may be directly output to the control module 50, or may be processed by a processing unit and then output to the control module 50. For example, the first identification information and the second identification information received by the second connector 30 may be processed by a phase inverter and then output to the control module 50. Then the control module 50 confirms connection status of the battery assembly 70 based on the received information.

Further, according to an embodiment of this application, before the detection module 20 outputs the first identification information to the electronic device 80 through the first connector 10, the control module 50 further outputs a control signal to the battery assembly 70 through the second connector 30. The detection module 20 further receives the control signal through the first connector 10, and outputs and locks the first identification information based on the control signal.

Understandably, the battery assembly 70 maintains an initial state at delivery from the manufacturer. The detection module 20 outputs the second identification information. After the battery assembly 70 is connected onto the electronic device 80, that is, after the first connector 10 is connected to the second connector 30, if the electronic device 80 detects that its anti-detachment function is disabled, the control module 50 outputs a control signal to the battery assembly 70 through the second connector 30 before the detection module 20 outputs the first identification information to the electronic device 80 through the first connector 10. The detection module 20 receives the control signal through the first connector 10, and outputs and locks the first identification information based on the control signal. When the second connector 30 receives the first identification information output by the detection module 20, the control module 50 confirms that the battery assembly 70 is in the connected state, and then enables the anti-detachment function. Thereafter, if the first connector 10 is disconnected from the second connector 30, the detection module 20 generates and outputs the second identification information. In this case, when the information received by the second connector 30 changes from the first identification information to the second identification information, the control module 50 confirms that the battery assembly 70 is disconnected, and further confirms that the battery assembly 70 is detached.

It needs to be noted that the control module 50 may determine, by detecting its own anti-detachment function flag bit, whether the anti-detachment function is enabled. For example, when the anti-detachment function flag bit is "0", it is determined that the anti-detachment function is disabled. After the anti-detachment function is enabled, the control module 50 may set the anti-detachment function flag bit to "1" and write the value into a memory such as a flash memory.

Therefore, the battery detection system according to the embodiments of this application can detect connection status of the battery assembly and the electronic device, and identify detachment of a battery and ensure safety of the battery and the electronic device in use.

Specifically, according to an embodiment of this application, the detection module 20 includes at least one detection unit. Each detection unit possesses a first input end, a second input end, and an output end. Before the detection module 20 outputs the first identification information to the electronic device 80 through the first connector 10, the control module 50 correspondingly outputs at least one first control signal and at least one second control signal to the battery assembly 70 through the second connector 30. The first input end of each detection unit receives a corresponding first control signal. The second input end of each detection unit receives a corresponding second control signal. Each detection unit further generates a first identification signal based on the first control signal and the second control signal and outputs the first identification signal through the output end of each detection unit.

Further, according to an embodiment of this application, the control module 50 is further configured to: when each detection unit outputs the first identification signal, change a corresponding second control signal into a third control signal and output the third control signal through the second connector 30. The second input end of each detection unit receives the third control signal, and locks the first identification signal based on the third control signal so that the output end of each detection unit keeps outputting the first identification signal.

Further, according to an embodiment of this application, when the first connector 10 is disconnected from the second connector 30, a signal of the second input end of each detection unit changes from the third control signal to the second control signal, and a signal of the first input end of each detection unit changes from the first control signal to a fourth control signal. Each detection unit further generates a second identification signal based on the second control signal and the fourth control signal.

According to an embodiment of this application, the detection module 20 outputs at least one first identification signal to the electronic device 80 as the first identification information, where the at least one first identification signal is output by the output end of at least one detection unit. Alternatively, the detection module 20 further includes a processing unit. The processing unit is configured to process at least one first identification signal output by the output end of at least one detection unit, so as to obtain a first processed signal. The detection module 20 outputs the first processed signal to the electronic device 80 as the first identification information. The detection module 20 outputs at least one second identification signal to the electronic device 80 as the second identification information, where the at least one second identification signal is output by the output end of at least one detection unit. Alternatively, the processing unit is configured to process at least one second identification signal output by the output end of at least one detection unit, so as to obtain a second processed signal. The detection module 20 outputs the second processed signal to the electronic device 80 as the second identification information.

The first control signal is a high-level signal, the second control signal is a rising-edge signal, the third control signal is a low-level signal, the fourth control signal is a low-level signal, the first identification signal is a low-level signal, and the second identification signal is a high-level signal.

Depending on a specific situation, the first identification information may be at least one high-level signal, or at least one low-level signal, or a combination of a high-level signal and a low-level signal. For example, when at least one first identification signal output by the output end of at least one detection unit is used as the first identification information, the first identification information is a low-level signal. When a first processed signal is used as the first identification information and the first processed signal is obtained by the processing unit by processing at least one first identification signal output by the output end of at least one detection unit, the first identification information may be at least one high-level signal or a combination of a high-level signal and a low-level signal. For example, if the processing unit is a phase inversion circuit, the first identification information is a high-level signal.

Likewise, depending on a specific situation, the second identification information may be at least one high-level signal, or at least one low-level signal, or a combination of a high-level signal and a low-level signal. For example, when at least one second identification signal output by the output end of at least one detection unit is used as the second identification information, the second identification information is a high-level signal. When a second processed signal is used as the second identification information and the second processed signal is obtained by the processing unit by processing at least one second identification signal output by the output end of at least one detection unit, the second identification information may be at least one low-level signal or a combination of a high-level signal and a low-level signal. For example, if the processing unit is a phase inversion circuit, the second identification information is a low-level signal.

Understandably, after the battery assembly 70 is connected onto the electronic device 80, that is, after the first connector 10 is connected to the second connector 30, if the electronic device 80 detects that its anti-detachment function is disabled, the control module 50 correspondingly outputs at least one first control signal and at least one second control signal to the battery assembly 70 through the second connector 30 before the detection module 20 outputs the first identification information to the electronic device 80 through the first connector 10. The first input end of each detection unit in the detection module 20 receives a corresponding first control signal output by the control module 50 through the second connector 30. The second input end of each detection unit receives a corresponding second control signal output by the control module 50 through the second connector 30. Then each detection unit in the detection module 20 generates a first identification signal based on the first control signal and the second control signal and outputs the first identification signal through the output end of each detection unit. The detection module 20 outputs at least one first identification signal to the electronic device 80 as the first identification information, where the at least one first identification signal is output by the output end of at least one detection unit; or, outputs a first processed signal to the electronic device 80 as the first identification information, where the first processed signal is obtained by the processing unit by processing at least one first identification signal output by the output end of at least one detection unit.

Thereafter, when the second connector 30 receives the first identification information output by the detection module 20, the control module 50 changes at least one second control signal correspondingly output through the second connector 30 into a third control signal and, when the second input end of each detection unit receives the third control signal, locks the first identification signal based on the third control signal so that the output end of each detection unit keeps outputting the first identification signal. The control module 50 confirms that the battery assembly 70 is in the connected state. This means that the anti-detachment function of the electronic device 80 is enabled. In this case, the electronic device 80 may set the anti-detachment function flag bit to a preset value such as "1" and write the value into a memory.

When the first connector 10 is disconnected from the second connector 30, a signal of the second input end of each detection unit changes from the third control signal to the second control signal, and a signal of the first input end of each detection unit changes from the first control signal to a fourth control signal. Each detection unit further generates a second identification signal based on the second control signal and the fourth control signal. At this time, the battery assembly 70 returns to the initial state. To be specific, the output end of each detection unit in the detection module 20 outputs a second identification signal, that is, a high-level signal. After the first connector 10 is connected to the second connector 30 again after being disconnected, the detection module 20 outputs at least one second identification signal to the electronic device 80 as the second identification information, where the at least one second identification signal is output by the output end of at least one detection unit. Alternatively, the detection module 20 outputs a second processed signal to the electronic device 80 as the second identification information, where the second processed signal is obtained by the processing unit by processing the at least one second identification signal output by the output end of the at least one detection unit. In a case that the anti-detachment function is enabled, when the information output by the detection module 20 and received by the second connector 30 changes from the first identification information to the second identification information, the control module 50 confirms that the battery assembly 70 is disconnected, and then confirms that the battery assembly 70 is detached.

The control module 50 is further configured to: after confirming that the battery assembly 70 is disconnected, exercise restriction control on the battery assembly 70 until the anti-detachment function is reset. For example, inspection may be performed at a professional maintenance service point, and a professional may reset the anti-detachment function. This can avoid risks of detaching and damaging the battery assembly, and ensure the safety of the battery assembly and the electronic device in use.

For example, the restriction control may be to prompt that the battery assembly 70 has been detached, or to directly lock the electronic device 80, or to preclude the battery assembly 70 from supplying power to the electronic device 80.

Further, according to an embodiment of this application, the battery assembly 70 includes a battery cell 40, and supplies power to each detection unit through the battery cell 40. When the battery assembly 70 stops supplying power to the electronic device 80, a signal of the second input end of each detection unit is maintained until the third control signal. Each detection unit locks the first identification signal based on the third control signal, and keeps outputting the first identification signal through the output end.

Understandably, when the battery assembly 70 exercises power-off protection control on the electronic device 80, the battery assembly 70 stops supplying power to the electronic device 80. For example, the power-off protection control may be exercised on the electronic device 80 when the battery assembly 70 is overheated or the battery assembly 70 lacks electrical power or the like. The electronic device 80 is powered off, and each detection unit in the detection module 20 is powered by the battery cell 40. The second input end of each detection unit keeps receiving the third control signal, that is, the low-level signal. Each detection unit locks the first identification signal based on the third control signal, and keeps outputting the first identification signal through the output end.

In this case, the battery detection system works normally, the electronic device 80 is powered off, and the control module 50 keeps outputting the third control signal, that is, the low-level signal, through the second connector 30. The second input end of each detection unit keeps receiving the low-level signal output by the control module 50. Each detection unit locks the first identification signal (that is, a low-level signal) based on the received third control signal (that is, a low-level signal), and keeps outputting the first identification signal through the output end. The detection module 20 outputs at least one first identification signal to the electronic device 80 as the first identification information, where the at least one first identification signal is output by the output end of at least one detection unit; or, outputs a first processed signal to the electronic device 80 as the first identification information, where the first processed signal is obtained by the processing unit by processing at least one first identification signal output by the output end of at least one detection unit. When the battery assembly 70 ends up the power-off protection control on the electronic device 80, for example, after the electronic device 80 restarts, the control module 50 determines, when the second connector 30 receives the first identification information output by the output end of the detection module 20, that the battery assembly 70 is in normal use without being detached.

Further, according to an embodiment of this application, the first connector 10 possesses at least one first pin, at least one second pin, and at least one third pin. Each detection unit includes a flip-flop. The flip-flop possesses a CLK end, a D end, and a Q end. The CLK end of the flip-flop is used as a second input end of the detection unit and connected to a corresponding first pin in the first connector 10. The D end of the flip-flop is used as a first input end of the detection unit and connected to a corresponding second pin in the first connector 10. The Q end of the flip-flop is used as an output end of the detection unit and directly connected to a corresponding third pin in the first connector 10. Alternatively, the Q end of the flip-flop is used as an output end of the detection unit and connected to a corresponding input end of a processing unit in the detection module 20. At least one output end of the processing unit is further correspondingly connected to the at least one third pin respectively.

Furthermore, according to an embodiment of this application, each detection unit further includes a first resistor and a second resistor. The CLK end of the flip-flop is connected to a positive electrode of a battery cell 40 in the battery assembly 70 through the first resistor. The D end of the flip-flop is connected to a negative electrode of the battery cell 40 in the battery assembly 70 through the second resistor and then grounded.

A power end VCC of the flip-flop is connected to a positive electrode of the battery cell 40 in the battery assembly 70. A ground end GND of the flip-flop is connected to a negative electrode of the battery cell 40 in the battery assembly 70. An operating voltage of the flip-flop supports 0.8 V to 5.5 V, and power consumption is less than 1 Ua.

Figure 2:
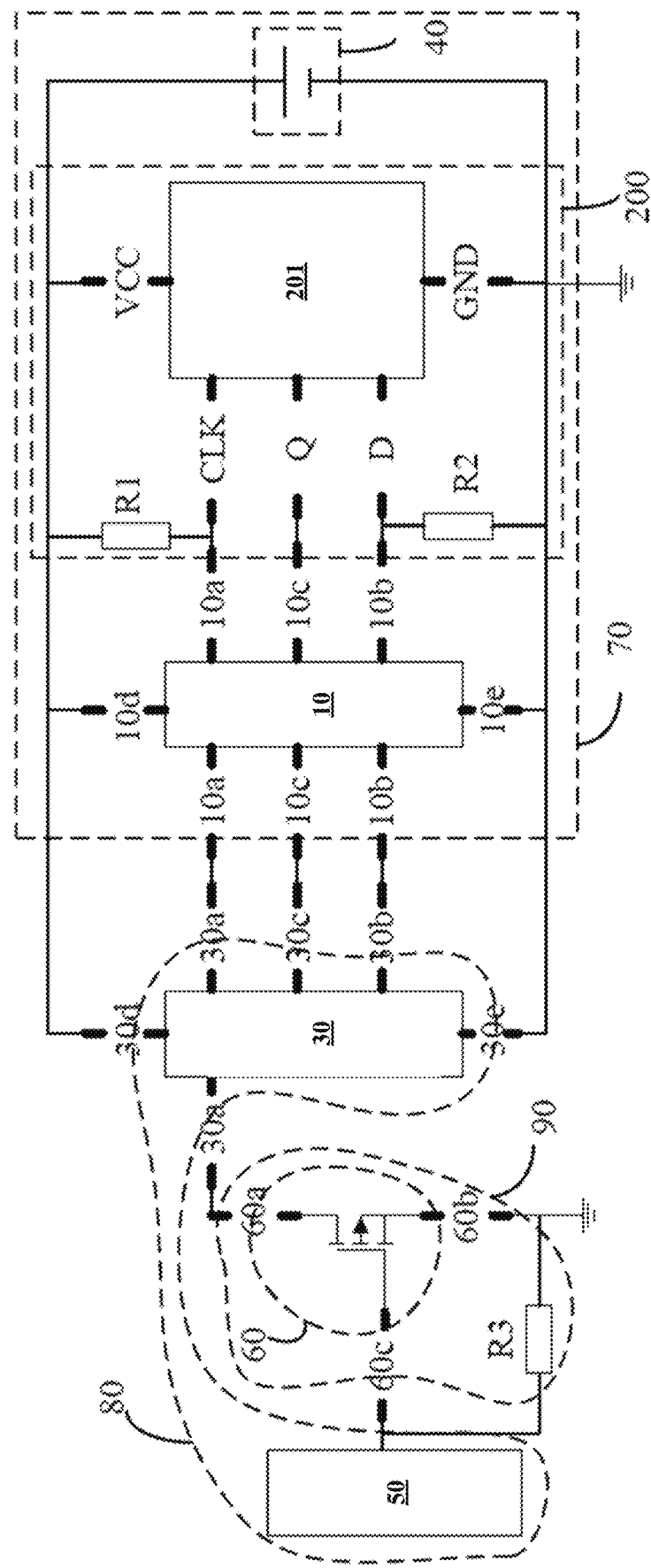
FIG. 2 is a schematic block diagram of a battery detection system according to an embodiment of this application.
Figure 3:
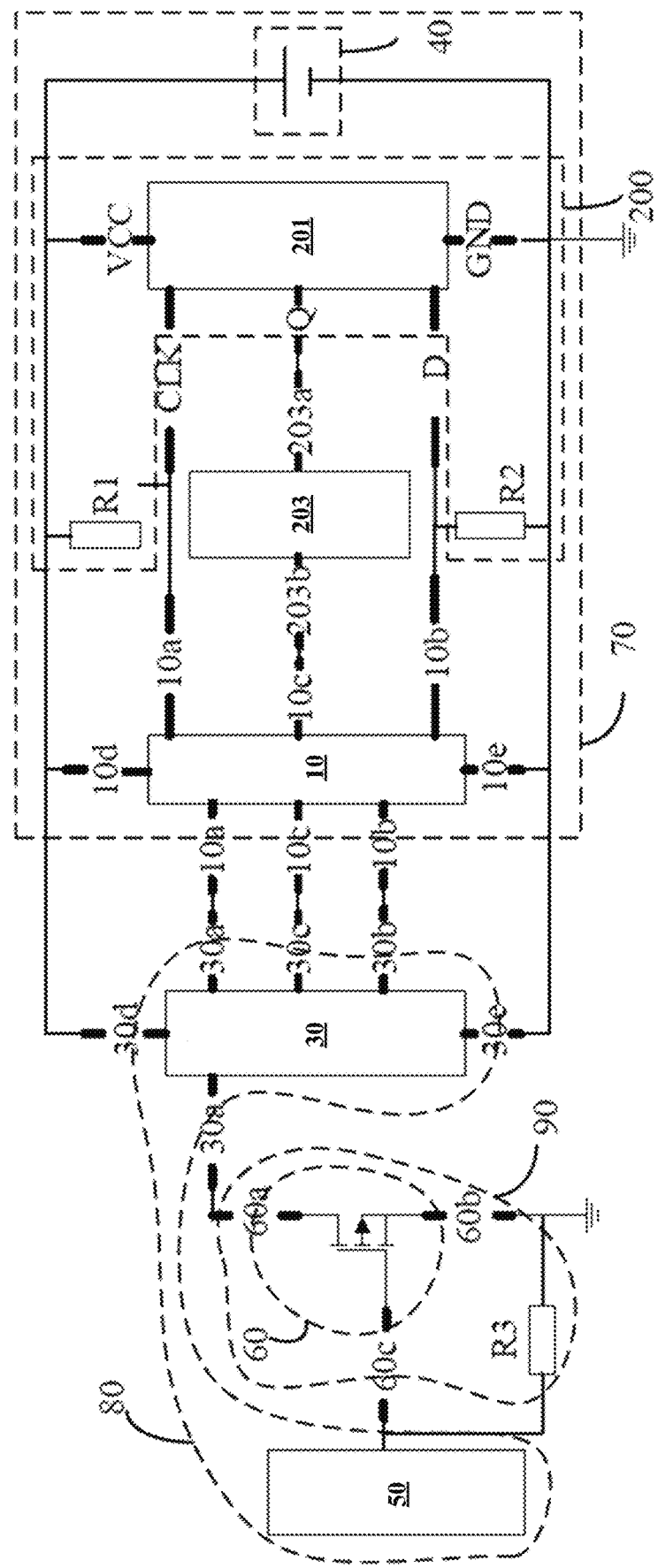
FIG. 3 is a schematic block diagram of a battery detection system according to another embodiment of this application.

For example, as shown in FIG. 2, when the detection module 20 includes one detection unit 200, the first connector 10 possesses one first pin 10a, one second pin 10b, and one third pin 10c. The detection unit 200 includes a flip-flop 201. The CLK end of the flip-flop 201 is used as a second input end of the detection unit 200 and connected to a first pin 10a in the first connector 10. The D end of the flip-flop 201 is used as a first input end of the detection unit 200 and connected to a second pin 10b in the first connector 10. The Q end of the flip-flop 201 is used as an output end of the detection unit 200 and connected to a third pin 10c in the first connector 10. In addition, as shown in FIG. 3, the detection module 20 may further include a processing unit 203. The Q end of the flip-flop 201, which serves as the output end of the detection unit 200, may also be connected to the input end 203a of the processing unit 203. The output end 203b of the processing unit 203 is further connected to the third pin 10c.

As shown in FIG. 2 to FIG. 3, the detection unit 200 further includes a first resistor R1 and a second resistor R2. The CLK end of the flip-flop 201 is connected to the positive electrode of the battery cell 40 in the battery assembly 70 through the first resistor R1. The D end of the flip-flop 201 is connected to the negative electrode of the battery cell 40 in the battery assembly 70 through the second resistor R2 and then grounded. The power end VCC of the flip-flop 201 is connected to the positive electrode of the battery cell 40 in the battery assembly 70. The ground end GND of the flip-flop 201 is connected to the negative electrode of the battery cell 40 in the battery assembly 70.

In the embodiment of this application, when the first connector 10 is connected to the second connector 30, the first pin in the second connector 30 is connected to the corresponding first pin in the first connector 10, the second pin in the second connector 30 is connected to the corresponding second pin in the first connector 10, and the third pin in the second connector 30 is connected to the corresponding third pin in the first connector 10. A fourth pin in the first connector 10 is connected to the positive electrode of the battery cell 40 and then connected to the fourth pin in the second connector 30. A fifth pin in the first connector 10 is connected to the negative electrode of the battery cell 40 and then connected to the fifth pin in the second connector 30. In this way, the battery cell 40 supplies power to the electronic device 80 through the first connector 10.

For example, as shown in FIG. 2 to FIG. 3, if the detection module 20 includes a detection unit 200, and correspondingly, the first connector 10 and the second connector 30 each possess one first pin, one second pin, and one third pin, then when the first connector 10 is connected to the second connector 30, the first pin 30a in the second connector 30 is connected to the first pin 10a in the first connector 10, the second pin 30b in the second connector 30 is connected to the second pin 10b in the first connector 10, the third pin 30c in the second connector 30 is connected to the third pin 10c in the first connector 10, the fourth pin 10d in the first connector 10 is connected to the positive electrode of the battery cell 40 and then connected to the fourth pin 30d in the second connector 30, and the fifth pin 10e in the first connector 10 is connected to the negative electrode of the battery cell 40 and then connected to the fifth pin 30e in the second connector 30. In this way, the battery cell 40 supplies power to the electronic device 80 through the first connector 10.

Therefore, circuit connection of the battery detection system according to this embodiment of this application is simple, and involves no additional circuit structure. Communication between the battery assembly 70 and the electronic device 80 can be implemented through the connection between the first connector 10 and the second connector 30.

Understandably, after the battery assembly 70 is connected onto the electronic device 80, that is, after the first connector 10 is connected to the second connector 30, if the electronic device 80 detects that its anti-detachment function is disabled, the control module 50 outputs a first control signal (that is, a high-level signal) through the second pin in the second connector 30 before the detection module 20 outputs the first identification information to the electronic device 80 through the first connector 10. The D end of the flip-flop, which serves as the first input end of the detection unit, receives a corresponding high-level signal through the second pin in the first connector 10. Thereafter, the control module 50 outputs a second control signal (that is, a rising-edge signal) through the first pin in the second connector 30, and the CLK end of the flip-flop, which serves as the second input end of the detection unit, receives the corresponding rising-edge signal through the first pin in the first connector 10. Therefore, the Q end of the flip-flop, which serves as the output end of the detection unit, outputs a first identification signal (that is, a low-level signal).

According to an embodiment of this application, as shown in FIG. 2 to FIG. 3, the control module 50 outputs a second control signal or a third control signal by controlling turn-on and turn-off of a switch assembly 90. The switch assembly 90 includes a first switch transistor 60 and a third resistor R3. A first end 60a of the first switch transistor 60 is connected to the second connector 30. Specifically, the first end 60a of the first switch transistor 60 is connected to the first pin in the second connector 30. In the two embodiments shown in FIG. 2 and FIG. 3, the first end 60a of the first switch transistor 60 is connected to the first pin 30a in the second connector 30, a second end 60b of the first switch transistor 60 is grounded, and a control end 60c of the first switch transistor 60 is connected to the control module 50. The first switch transistor 60 is turned on or off under the control of the control module 50. One end of the third resistor R3 is connected to the control end 60c of the first switch transistor 60. A second end of the third resistor R3 is connected to the second end 60b of the first switch transistor 60.

Understandably, when the control module 50 controls the first switch transistor 60 to turn on, the first pin in the second connector 30 outputs a third control signal. When the control module 50 controls the first switch transistor 60 to turn off, the first pin in the second connector 30 outputs a second control signal.

Thereafter, when the corresponding second control signal (that is, a rising-edge signal) received by the CLK end of the flip-flop (serving as the second input end of the detection unit) through the first pin in the first connector 10 and output by the control module 50 through the first pin in the second connector 30 changes to a third control signal (that is, a low-level signal), the Q end of the flip-flop locks the first identification signal and keeps outputting the first identification signal (that is, a low-level signal) by serving as the output end of the detection unit. Further, the detection module 20 outputs first identification information to the electronic device 80, where the first identification information is at least one first identification signal output by the output end of at least one detection unit or is a first processed signal obtained by the processing unit by processing at least one first identification signal output by the output end of at least one detection unit. In this case, when the third pin in the second connector 30 detects the first identification information output by the detection module 20, the control module 50 confirms that the battery assembly 70 is in a connected state, and that the anti-detachment function of the electronic device 80 is enabled. In this case, the electronic device 80 may set the anti-detachment function flag bit to a preset value such as "1" and write the value into a memory.

When the first connector 10 is disconnected from the second connector 30, the CLK end of the flip-flop is connected to the positive electrode of the battery cell 40 in the battery assembly 70 through the first resistor, and the D end of the flip-flop is connected to the negative electrode of the battery cell 40 in the battery assembly 70 through the second resistor and then grounded. In other words, a level signal of the CLK end of the flip-flop changes from a low level to a high level. The CLK end of the flip-flop, which serves as the second input end of the detection unit, generates a second control signal, that is, a rising-edge signal. The D end of the flip-flop is a low-level signal, and the control signal at the D end of the flip-flop, which serves as the first input end of the detection unit, changes from a first control signal (a high-level signal) to a fourth control signal (a low-level signal). Therefore, the Q end of the flip-flop, which serves as the output end of the detection unit, outputs a second identification signal (a high-level signal) when the CLK end of the flip-flop is the second control signal (a rising-edge signal) and the D end of the flip-flop is the fourth control signal (a low-level signal). The battery assembly 70 returns to the initial state. The detection module 20 outputs second identification information to the electronic device 80, where the second identification information is at least one second identification signal output by the output end of at least one detection unit or is a second processed signal obtained by the processing unit by processing at least one second identification signal output by the output end of at least one detection unit. When the first connector 10 is connected to the second connector 30 again after being disconnected, in a case that the anti-detachment function is already enabled, when the information received by the third pin in the second connector 30 and output by the detection module 20 through the third pin in the first connector 10 changes from the first identification information to the second identification information, the control module 50 confirms that the battery assembly 70 is disconnected, that is, detached.

Further, understandably, in this embodiment of this application, detachment of the battery assembly 70 may include detaching at least the battery cell 40 in the battery assembly 70 as well as the first connector 10 and the detection module 20.

In conclusion, in the battery detection system according to this embodiment of this application, when the first connector is connected to the second connector, the detection module outputs the first identification information to the electronic device through the first connector. When the second connector receives the first identification information, the control module confirms that the battery assembly is in a connected state. After the first connector is disconnected from the second connector, the detection module generates and outputs the second identification information. When the information received by the second connector changes from the first identification information to the second identification signal, the control module confirms that the battery assembly is disconnected. Therefore, the battery detection system according to this embodiment of this application can detect connection status of the battery assembly and the electronic device, and identify detachment of a battery and ensure safety of the battery and the electronic device in use.

Figure 4:
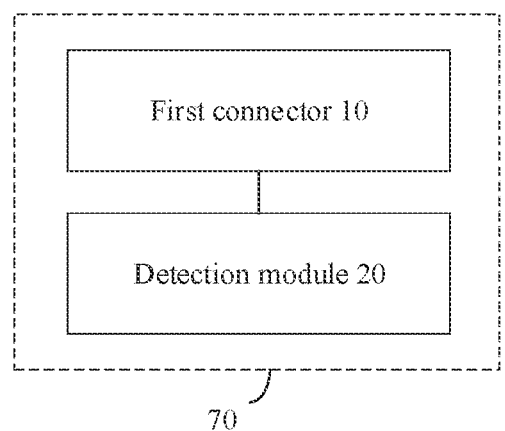
FIG. 4 is a schematic block diagram of a battery assembly according to an embodiment of this application.

Based on the battery detection system disclosed in the foregoing embodiment, an embodiment of this application further discloses a battery assembly. FIG. 4 is a schematic block diagram of a battery assembly according to an embodiment of this application. As shown in FIG. 4, the battery assembly 70 includes a first connector 10 and a detection module 20 connected to the first connector 10.

The first connector 10 fits with the second connector 30 of an electronic device 80 to implement connection. The detection module 20 is configured to detect whether the first connector 10 is connected to the second connector 30. When the first connector 10 is connected to the second connector 30, the detection module 20 outputs first identification information through the first connector 10. The first identification information is used to indicate that the battery assembly 70 is in a connected state. After the first connector 10 is disconnected from the second connector 30, the detection module 20 generates and outputs second identification information, and the second identification information changed from the first identification information is used to indicate that the battery assembly 70 is disconnected.

Specifically, according to an embodiment of this application, when the first connector 10 is connected to the second connector 30 of the electronic device 80, the detection module 20 is configured to receive, through the first connector 10, a control signal output by the electronic device 80, and output first identification information based on the control signal. Therefore, when receiving the first identification information output by the detection module 20, the electronic device 80 confirms that the battery assembly 70 is in a connected state.

Further, according to an embodiment of this application, the detection module 20 includes at least one detection unit. Each detection unit possesses a first input end, a second input end, and an output end. The first input end of each detection unit receives a corresponding first control signal output by the electronic device 80. The second input end of each detection unit receives a corresponding second control signal output by the electronic device 80. Each detection unit further generates a first identification signal based on the first control signal and the second control signal, and outputs the first identification signal through the output end of each detection unit. The first control signal and the second control signal are output by the electronic device 80 through the second connector 30 before the detection module 20 outputs the first identification information to the electronic device 80 through the first connector 10.

Furthermore, according to an embodiment of this application, the second input end of each detection unit receives a third control signal, and locks the first identification signal based on the third control signal, so that the output end of each detection unit keeps outputting the first identification signal. The third control signal is output through the second connector 30 when each detection unit outputs the first identification signal.

According to an embodiment of this application, when the first connector 10 is disconnected from the second connector 30, a signal of the second input end of each detection unit changes from the third control signal to the second control signal, and a signal of the first input end of each detection unit changes from the first control signal to a fourth control signal. Each detection unit further generates a second identification signal based on the second control signal and the fourth control signal.

Further, according to an embodiment of this application, the detection module 20 outputs at least one first identification signal to the electronic device 80 as the first identification information, where the at least one first identification signal is output by the output end of at least one detection unit. Alternatively, the detection module 20 further includes a processing unit. The processing unit is configured to process at least one first identification signal output by the output end of at least one detection unit, so as to obtain a first processed signal. The detection module 20 outputs the first processed signal to the electronic device 80 as the first identification information. The detection module 20 outputs at least one second identification signal to the electronic device 80 as the second identification information, where the at least one second identification signal is output by the output end of at least one detection unit. Alternatively, the processing unit is configured to process at least one second identification signal output by the output end of at least one detection unit, so as to obtain a second processed signal. The detection module 20 outputs the second processed signal to the electronic device 80 as the second identification information.

According to an embodiment of this application, the battery assembly 70 includes a battery cell 40, and supplies power to each detection unit through the battery cell 40. When the battery assembly 70 stops supplying power to the electronic device 80, a signal of the second input end of each detection unit is maintained until the third control signal. Each detection unit locks the first identification signal based on the third control signal, and keeps outputting the first identification signal through the output end.

According to an embodiment of this application, the first control signal is a high-level signal, the second control signal is a rising-edge signal, the third control signal is a low-level signal, the fourth control signal is a low-level signal, the first identification signal is a low-level signal, and the second identification signal is a high-level signal.

Specifically, according to an embodiment of this application, the first connector 10 possesses at least one first pin, at least one second pin, and at least one third pin. Each detection unit includes a flip-flop. The flip-flop possesses a CLK end, a D end, and a Q end. The CLK end of the flip-flop is used as a second input end of the detection unit and connected to a corresponding first pin in the first connector 10. The D end of the flip-flop is used as a first input end of the detection unit and connected to a corresponding second pin in the first connector 10. The Q end of the flip-flop is used as an output end of the detection unit and directly connected to a corresponding third pin in the first connector 10. Alternatively, the Q end of the flip-flop is used as an output end of the detection unit and connected to a corresponding input end of a processing unit in the detection module 20. At least one output end of the processing unit is further correspondingly connected to the at least one third pin respectively.

Further, according to an embodiment of this application, each detection unit further includes a first resistor and a second resistor. The CLK end of the flip-flop is connected to a positive electrode of a battery cell 40 in the battery assembly 70 through the first resistor. The D end of the flip-flop is connected to a negative electrode of the battery cell 40 in the battery assembly 70 through the second resistor and then grounded.

According to an embodiment of this application, a power end VCC of the flip-flop is connected to a positive electrode of the battery cell 40 in the battery assembly 70. A ground end GND of the flip-flop is connected to a negative electrode of the battery cell 40 in the battery assembly 70.

Further, according to an embodiment of this application, the detection module 20 is disposed in the first connector 10 in a packaging manner.

In conclusion, in the battery assembly according to this embodiment of this application, when the first connector is connected to the second connector, the detection module outputs the first identification information through the first connector. The first identification information is used to indicate that the battery assembly is in a connected state. After the first connector is disconnected from the second connector, the detection module generates and outputs the second identification information. The second identification information changed from the first identification information is used to indicate that the battery assembly is disconnected. Therefore, the battery assembly according to this embodiment of this application can detect connection status of the battery assembly and the electronic device, and then identify detachment of a battery and ensure safety of the battery and an electronic device in use.

Figure 5:
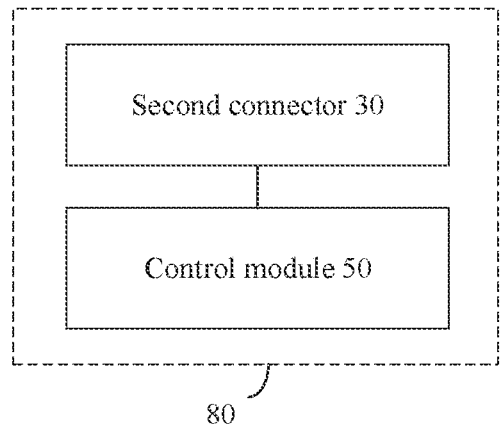
FIG. 5 is a schematic block diagram of an electronic device according to an embodiment of this application.

Based on the battery detection system disclosed in the foregoing embodiment, an embodiment of this application further discloses an electronic device. FIG. 5 is a schematic block diagram of an electronic device according to an embodiment of this application. As shown in FIG. 5, the electronic device 80 includes a second connector 30 and a control module 50 connected to the second connector 30.

The second connector 30 receives first identification information output by a battery assembly 70. When the second connector 30 receives the first identification information, the control module 50 confirms that the battery assembly 70 is in a connected state. The second connector 30 receives second identification information output by the battery assembly 70. When information received by the second connector 30 changes from the first identification information to the second identification information, the control module 50 confirms that the battery assembly 70 is disconnected, where the second identification information is generated after the first connector 10 is disconnected from the second connector 30.

Specifically, according to an embodiment of this application, before the battery assembly 70 outputs the first identification information, the control module 50 further outputs a control signal to the battery assembly 70 through the second connector 30.

Further, according to an embodiment of this application, the control module 50 correspondingly outputs at least one first control signal and at least one second control signal to the battery assembly 70 through the second connector 30.

Furthermore, according to an embodiment of this application, the control module 50 is further configured to: when the second connector 30 receives the first identification information output by the battery assembly 70, change a corresponding second control signal into a third control signal and output the third control signal through the second connector 30.

According to an embodiment of this application, the first control signal is a high-level signal, the second control signal is a rising-edge signal, the third control signal is a low-level signal, the fourth control signal is a low-level signal, the first identification signal is a low-level signal, and the second identification signal is a high-level signal.

According to an embodiment of this application, the control module 50 is further configured to exercise restriction control on the battery assembly 70 after confirming that the battery assembly 70 is disconnected.

Further, according to an embodiment of this application, the control module 50 outputs the second control signal or the third control signal by controlling turn-on and turn-off of a switch assembly 90. The switch assembly 90 includes: a first switch transistor 60 and a third resistor R3. A first end 60a of the first switch transistor 60 is connected to a first pin in the second connector 30, a second end 60b of the first switch transistor 60 is grounded, and a control end 60c of the first switch transistor 60 is connected to the control module 50. The first switch transistor 60 is turned on or off under control of the control module 50. One end of the third resistor R3 is connected to the control end 60c of the first switch transistor 60, and a second end of the third resistor R3 is connected to the second end 60b of the first switch transistor 60.

In conclusion, in the electronic device according to this embodiment of this application, when the second connector receives the first identification information output by the battery assembly, the control module confirms that the battery assembly is in a connected state. After the information received by the second connector and output by the battery assembly changes from the first identification information to the second identification information, the control module confirms that the battery assembly is disconnected. Therefore, the electronic device according to this embodiment of this application can detect connection status of the battery assembly and the electronic device, and then identify detachment of a battery and ensure safety of the battery and the electronic device in use.

Figure 6:
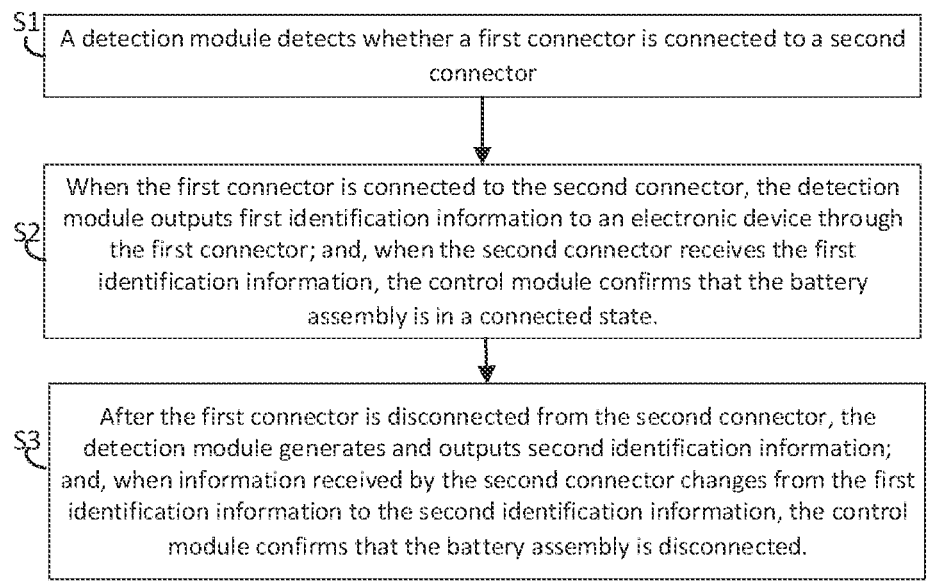
FIG. 6 is a schematic flowchart of a battery detection method according to an embodiment of this application.

Corresponding to the battery detection system disclosed in the foregoing embodiment, an embodiment of this application further discloses a battery detection method. FIG. 6 is a schematic flowchart of a battery detection method according to an embodiment of this application. The battery detection method is designed to detect whether a battery assembly is connected to an electronic device. The battery assembly includes a first connector and a detection module connected to the first connector. The electronic device includes a second connector and a control module connected to the second connector. The first connector fits with the second connector to implement connection. As shown in FIG. 6, the battery detection method includes the following steps:

S1. A detection module detects whether a first connector is connected to a second connector.

S2. When the first connector is connected to the second connector, the detection module outputs first identification information to an electronic device through the first connector; and, when the second connector receives the first identification information, the control module confirms that the battery assembly is in a connected state.

S3. After the first connector is disconnected from the second connector, the detection module generates and outputs second identification information; and, when information received by the second connector changes from the first identification information to the second identification information, the control module confirms that the battery assembly is disconnected.

It needs to be noted that the foregoing interpretation and description on the embodiments of the battery detection system are also applicable to the battery detection method disclosed in this embodiment, details of which are omitted here.

In conclusion, in the battery detection method according to this embodiment of this application, the detection module detects whether the first connector is connected to the second connector. When the first connector is connected to the second connector, the detection module outputs the first identification information to the electronic device through the first connector. When the second connector receives the first identification information, the control module confirms that the battery assembly is in a connected state. After the first connector is disconnected from the second connector, the detection module generates and outputs the second identification information. When the information received by the second connector changes from the first identification information to the second identification signal, the control module confirms that the battery assembly is disconnected. Therefore, the battery detection method according to this embodiment of this application can detect connection status of the battery assembly and the electronic device, and identify detachment of a battery and ensure safety of the battery and the electronic device in use.

Understandably, in the context of this application, a direction or a positional relationship indicated by the terms such as "center", "longitudinal", "transverse", "length", "width", "thickness", "upper", "lower", "before", "after", "left", "right", "vertical", "horizontal", "top", "bottom", "inner", "outer", "clockwise", "counterclockwise", "axial", "radial", and "circumferential" is a direction or positional relationship based on the illustration in the drawings, and is merely intended for ease or brevity of description of this application, but not intended to indicate or imply that the indicated device or component must be located in the specified direction or constructed or operated in the specified direction. Therefore, such terms are not to be understood as a limitation on this application.

In addition, the terms "first" and "second" are used merely for descriptive purposes but are not to be construed as indicating or implying relative importance or implicitly specifying the quantity of technical features indicated. Therefore, the features preceded by "first" or "second" may explicitly or implicitly include at least one of the features. In the description of this application, unless otherwise expressly specified, "a plurality of" means at least two, for example, two, three, or more.

In this application, unless otherwise expressly specified and qualified, the terms such as "mounting", "concatenation", "connection", and "fixing" need to be understood in a broad sense, for example, understood as a fixed connection or a detachable connection or understood as being integrated into a whole; or understood as a mechanical connection or an electrical connection, a direct connection or an indirect connection implemented through an intermediary; or understood as interior communication between two components or interaction between two components. A person of ordinary skill in the art understands the specific meanings of the terms in this application according to the context.

In this application, unless otherwise expressly specified and qualified, a first feature being "on" or "under" a second feature may be that the first feature is in direct contact with the second feature, or the first feature is in indirect contact with the second feature through an intermediary. In addition, a first feature being "on", "above", or "over" a second feature may be that the first feature is exactly above or obliquely above the second feature, or simply that the first feature is at an altitude higher than the second feature. A first feature being "under", "below", or "beneath" a second feature may be that the first feature is exactly under or obliquely under the second feature, or simply that the first feature is at an altitude lower than the second feature.

In the context of this specification, reference to "one embodiment", "some embodiments", "one or more embodiments", "an embodiment", "specific example", "some examples", and the like means that a particular feature, structure, material, or characteristic described in connection with the embodiment or example is included in at least one embodiment or example of this application. In this embodiment, the appearances of such terms are not necessarily referring to the same embodiment or example. Furthermore, the particular features, structures, materials, or characteristics may be combined in any suitable manner in one or more embodiments. In addition, a person skilled in the art can integrate or combine different embodiments or examples as well as the features of different embodiments or examples described herein to the extent that they do not contradict each other.

Although the embodiments of this application have been shown and described above, it is understandable that the foregoing embodiments are exemplary but not intended as a limitation on this application. A person of ordinary skill in the art may make variations, modifications, substitutions, and derivations to the embodiments without departing from the scope of this application.

What is claimed is:

1. A battery detection system, wherein the battery detection system comprises a battery assembly and an electronic device, the battery assembly comprises a first electrical connector and a detection module connected to the first electrical connector, the detection module including a detection unit having a first input end, a second input end, and an output end, the electronic device comprises a second electrical connector and a control module connected to the second electrical connector, the first electrical connector is different from the second electrical connector and the first electrical connector fits with the second electrical connector to implement an electrical connection, and the detection module is configured to detect whether the first electrical connector is connected to the second electrical connector, wherein when the first electrical connector is connected to the second electrical connector, and before the detection module outputs first identification information to the electronic device through the first electrical connector:
the control module outputs a first control signal and a second control signal to the battery assembly through the second electrical connector;
the first input end of the detection unit receives the first control signal through the first electrical connector;
the second input end of the detection unit receives the second control signal through the first electrical connector;
the detection unit generates a first identification signal based on the first control signal and the second control signal;
the detection unit outputs the first identification signal through the output end of the detection unit;
the detection module outputs and locks the first identification information based on the first control signal and the second control signal;
the detection module outputs the first identification information to the electronic device through the first electrical connector; and, when the second electrical connector receives the first identification information, the control module confirms that the battery assembly is in an electrically connected state; and after the first electrical connector is disconnected from the second electrical connector,
the detection module generates and outputs second identification information; and when information received by the second electrical connector changes from the first identification information to the second identification information, the control module confirms that the battery assembly is electrically disconnected.

2. The battery detection system according to claim 1, wherein, when the detection unit outputs the first identification signal, the control module is configured to change a corresponding second control signal into a third control signal and output the third control signal through the second connector; and the second input end of the detection unit receives the third control signal, and latches the first identification signal based on the third control signal so that the output end of the detection unit keeps outputting the first identification signal.

3. The battery detection system according to claim 2, wherein when the first connector is disconnected from the second connector,
a signal of the second input end of the detection unit changes from the third control signal to the second control signal, and a signal of the first input end of the detection unit changes from the first control signal to a fourth control signal; and
the detection unit further generates a second identification signal based on the second control signal and the fourth control signal.

4. The battery detection system according to claim 3, wherein
the detection module outputs at least one first identification signal to the electronic device as the first identification information, wherein the at least one first identification signal is output by the output end of at least one detection unit, or, the detection module further comprises a processing unit, the processing unit is configured to process at least one first identification signal output by the output end of at least one detection unit, so as to obtain a first processed signal, and the detection module outputs the first processed signal to the electronic device as the first identification information; and
the detection module outputs at least one second identification signal to the electronic device as the second identification information, wherein at least one second identification signal is output by the output end of at least one detection unit, or, the processing unit is configured to process at least one second identification signal output by the output end of at least one detection unit, so as to obtain a second processed signal, and the detection module outputs the second processed signal to the electronic device as the second identification information.

5. The battery detection system according to claim 2, wherein the battery assembly comprises a battery cell, and supplies power to the detection unit through the battery cell; and
when the battery assembly stops supplying power to the electronic device, a signal of the second input end of the detection unit is maintained until the third control signal, and the detection unit latches the first identification signal based on the third control signal, and keeps outputting the first identification signal through the output end.

6. The battery detection system according to claim 3, wherein the first control signal is a high-level signal, the second control signal is a rising-edge signal, the third control signal is a low-level signal, the fourth control signal is a low-level signal, the first identification signal is a low-level signal, and the second identification signal is a high-level signal.

7. The battery detection system according to claim 1, wherein the control module is configured to exercise restriction control on the battery assembly after confirming that the battery assembly is disconnected.

8. The battery detection system according to claim 1, wherein the first connector comprises at least one first pin, at least one second pin, and at least one third pin, the detection unit comprises a flip-flop, and the flip-flop comprises a CLK end, a D end, and a Q end;
the CLK end of the flip-flop is used as a second input end of the detection unit and connected to a corresponding first pin in the first connector;
the D end of the flip-flop is used as a first input end of the detection unit and connected to a corresponding second pin in the first connector;
the Q end of the flip-flop is used as an output end of the detection unit and is directly connected to a corresponding third pin in the first connector, or, the Q end of the flip-flop is used as an output end of the detection unit and is connected to a corresponding input end of a processing unit in the detection module, wherein at least one output end of the processing unit is correspondingly connected to the at least one third pin respectively.

9. The battery detection system according to claim 8, wherein the detection unit further comprises a first resistor and a second resistor, the CLK end of the flip-flop is connected to a positive electrode of a battery cell in the battery assembly through the first resistor, and the D end of the flip-flop is connected to a negative electrode of the battery cell in the battery assembly through the second resistor and then grounded.

10. The battery detection system according to claim 8, wherein a power end of the flip-flop is connected to a positive electrode of a battery cell in the battery assembly, and a ground end of the flip-flop is connected to a negative electrode of the battery cell in the battery assembly.

11. The battery detection system according to claim 2, wherein the control module outputs the second control signal or the third control signal by controlling turn-on and turn-off of a switch assembly, wherein the switch assembly comprises:
a first switch transistor, wherein a first end of the first switch transistor is connected to the second connector, a second end of the first switch transistor is grounded, a control end of the first switch transistor is connected to the control module, and the first switch transistor is turned on or off under control of the control module; and
a third resistor, wherein one end of the third resistor is connected to the control end of the first switch transistor, and a second end of the third resistor is connected to the second end of the first switch transistor.

12. The battery detection system according to claim 1, wherein the detection module is disposed in the first connector in a packaging manner.

13. A battery assembly, comprising a first electrical connector and a detection module connected to the first electrical connector, the detection module including a detection unit having a first input end, a second input end, and an output end, the first electrical connector is configured to fit with a second electrical connector of an electronic device to implement an electrical connection, the first electrical connector is different from the second electrical connector, and the detection module is configured to detect whether the first electrical connector is connected to the second electrical connector, wherein
when the first electrical connector is connected to the second electrical connector, and before the detection module outputs first identification information to the electronic device through the first electrical connector:
the control module outputs a first control signal and a second control signal to the battery assembly through the second electrical connector;
the first input end of the detection unit receives the first control signal through the first electrical connector;
the second input end of the detection unit receives the second control signal through the first electrical connector;
the detection unit generates a first identification signal based on the first control signal and the second control signal;
the detection unit outputs the first identification signal through the output end of the detection unit;
the detection module outputs and locks the first identification information based on the first control signal and the second control signal;
the detection module outputs the first identification information through the first electrical connector to indicate that the battery assembly is in an electrically connected state; and
after the first electrical connector is disconnected from the second electrical connector, the detection module generates and outputs second identification information to indicate that the battery assembly is electrically disconnected.

14. An electronic device, wherein the electronic device comprises a second electrical connector and a control module connected to the second connector, and the second electrical connector is configured to fit with a first electrical connector of a battery assembly to implement an electrical connection, the second electrical connector is different from the first electrical connector, the first electrical connector is connected to a detection module that includes a detection unit having a first input end, a second input end, and an output end, wherein;
when the second electrical connector is connected to the first electrical connector, and before the detection module outputs first identification information to the electronic device through the first electrical connector:
the control module outputs a first control signal and a second control signal to the battery assembly through the second electrical connector;
the first input end of the detection unit receives the first control signal through the first electrical connector;
the second input end of the detection unit receives the second control signal through the first electrical connector;
the detection unit generates a first identification signal based on the first control signal and the second control signal;
the detection unit outputs the first identification signal through the output end of the detection unit;
the detection module outputs and locks the first identification information based on the first control signal and the second control signal;
the second electrical connector is configured to receive the first identification information and second identification information output by the battery assembly, and the control module is configured to confirm, when the second electrical connector receives the first identification information, that the battery assembly is in an electrically connected state; and when information received by the second electrical connector changes from the first identification information to the second identification information, the control module confirms that the battery assembly is electrically disconnected, wherein the second identification information is generated after the first electrical connector is disconnected from the second electrical connector.

* * * * *